Nov. 16, 1943.  W. R. POSTLEWAITE  2,334,577
APPARATUS FOR SCORING COATED PIPE
Filed May 11, 1942  2 Sheets-Sheet 1

INVENTOR
William R. Postlewaite
By: [signature]
ATTORNEY

Nov. 16, 1943. W. R. POSTLEWAITE 2,334,577
APPARATUS FOR SCORING COATED PIPE
Filed May 11, 1942 2 Sheets-Sheet 2
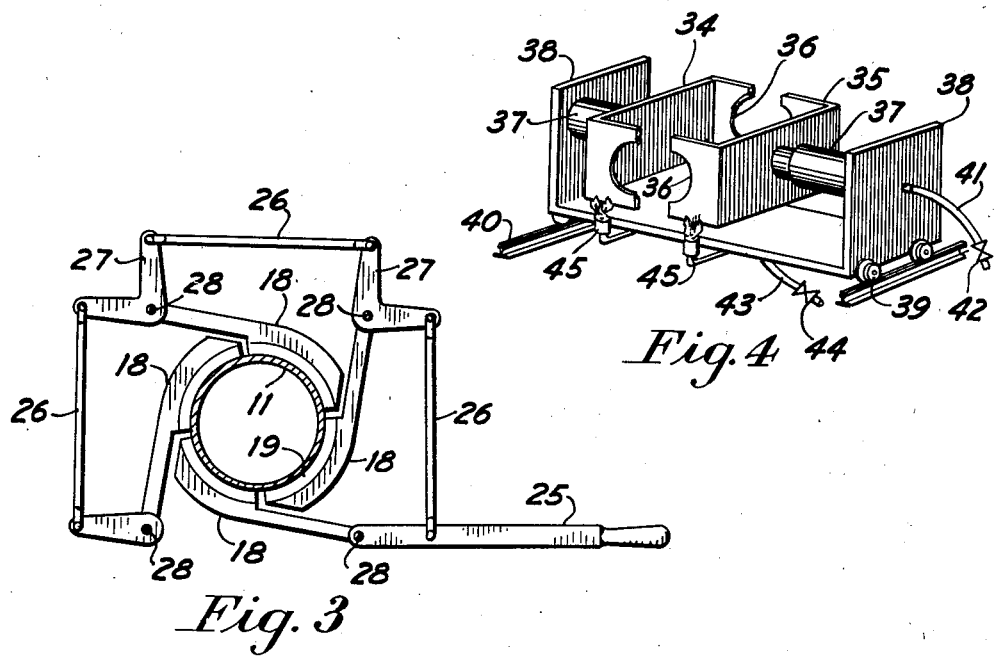
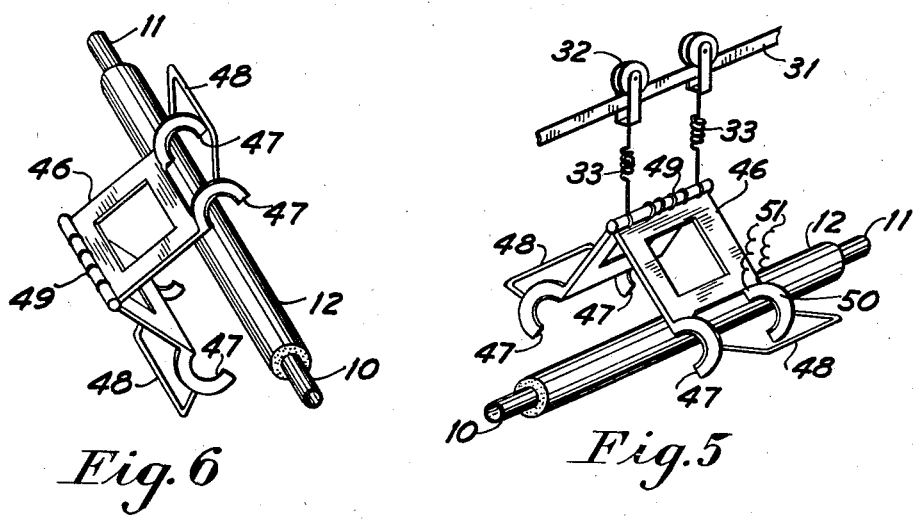
INVENTOR
William R. Postlewaite
By J. N. Adams
ATTORNEY Patented Nov. 16, 1943

2,334,577

UNITED STATES PATENT OFFICE 2,334,577

APPARATUS FOR SCORING COATED PIPE

William R. Postlewaite, Palo Alto, Calif., assignor to Standard Oil Company of California, San Francisco, Calif., a corporation of Delaware Application May 11, 1942, Serial No. 442,540

10 Claims. (Cl. 30—95)

This invention relates to a method and apparatus for scoring the coated ends of successive longitudinally advancing pipe sections on which has been applied a thick initially plastic coating, which may contain a thermoplastic binder, and particularly refers to a method and means for producing circumferential indentations in said coating at a spaced distance from the abutting ends of the pipe sections so that the coating may be removed from the ends of the pipe without loosening or damaging the main body of the coating between said ends.

Heretofore pipe sections which have been coated by coupling them successively and passing them through a coating process which applies a thick layer of initially plastic material have been finished by breaking or chipping the coating for a short distance back from the ends so that the pipe ends would be bare and in condition to be welded or otherwise secured together to form a long line. An improvement over that procedure is disclosed in my copending application, Serial No. 331,849, filed April 26, 1940, which issued June 30, 1942, as Patent No. 2,287,827. In the procedure there shown the coupler was adapted to surround the abutting ends of the pipes for a short distance and thereby prevent the deposition of the coating material on the ends. This proved to be reasonably satisfactory but, particularly in the case of large diameter pipe, the coating would act to bind or secure the coupling sections to the pipe ends so that when the couplers were removed, the coating itself would be cracked or loosened for a distance backwardly along the main body of the pipe section.

This invention comprehends broadly a method of trimming involving the steps of scoring or forming circumferential indentations at predetermined distances from the end faces of the abutting pipe sections, followed by removal of the short length of coating so segregated from the main body, without damage to the latter. The invention also includes the provision of means which are adapted to be spaced at a substantially equal distance on each side of the abutting ends of sections of pipe which are coupled together and coated with a thick layer of initially plastic material, said means being adapted to be pressed into the coating to score the latter substantially circumferentially. Thereafter when the coupling means, if any are provided, are removed or if the coating is chipped or broken for a short distance back from the extreme end of the pipe, the indentation or circumferential score line provided by the procedure just outlined will prevent cracks from travelling backwardly along the main body of the coating on the pipe. It will be understood that this procedure is applicable whether or not a coupler of the enclosing type, such as that of my Patent No. 2,287,827, issued June 30, 1942, is used. When the coupler is used, the score producing means may be spaced just beyond the outermost ends of the coupler sections.

It is an object of this invention to provide an improved method and means for finishing the ends of pipe sections after they have been given a thick initially plastic coating of material, such as a corrosion resistant material utilizing a bituminous or thermoplastic binder.

Another object is to provide a method and means which is applicable to a coating process in which the coupled sections of pipe are continuously passed out of the coating process with a longitudinal or helical motion.

Another object is to provide scoring means which may be operated either manually or automatically and which are adapted to be accurately located with respect to the coupled abutting ends of the successive pipe sections.

Another object is to provide a method and apparatus for producing spaced circumferential indentations or score lines on each side of the abutting ends of continuously coated pipe so that the coating may be removed between the score lines and the ends of the pipe sections without disturbing the bond between the main body of the coating and the pipe section.

Another object is to provide a means for providing circumferential scores on pipe which has an axial component of motion and which will be carried along with the pipe by said motion component.

These and other objects and advantages will be further apparent from the following description of the method and from the attached drawings which form a part of this specification and illustrate a preferred arrangement together with several alternative embodiments of means for practicing this invention.

In the drawings,

Figure 3 is a transverse sectional view of the actuating mechanism of the apparatus of Figure 2 taken on a plane transverse to the pipe axis and to the right of the supporting frame.

Figure 4 is a perspective view of an alternative form of support and automatic or power actuating means for the indenting members.

Figure 5 is a perspective view of an alternative arrangement of a hinged and manually operated frame for the indenting members.

Figure 6 is a perspective view of the apparatus of Figure 5 without a mechanical guide and support means therefor.

Figure 1:
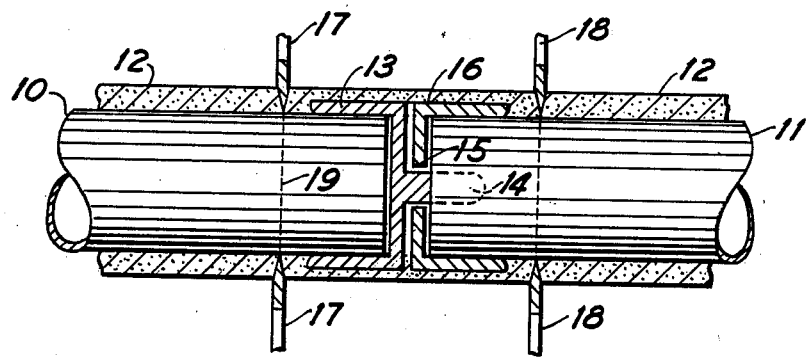
Figure 1 is a longitudinal diagrammatic sectional view of the abutting ends of two sections of pipe which have been coated, showing spaced scoring means pressed into the coating to form circumferential indentations on each side of the abutting ends.

Referring to the drawings, particularly to Figure 1, reference numerals 10 and 11 designate two sections of pipe which have been coated with a thick layer of initially plastic material 12. In this example, the ends of the pipes have been coupled and aligned by means of coupling section 13, which surrounds pipe 10 for a short distance and is provided with a central axial projection 14 adapted to be received in a corresponding opening 15 of the cooperating coupling section 16, to align the couplings and the pipe sections. The outer diameter of coupling sections 13 and 16 is desirably slightly smaller than that of coating 12 so that a thin layer of the coating is applied over those couplings.

The arrangement just described obviously gives no indication on the surface of the coating as to the location of the coupling sections 13 and 16. This location is easily determined as the pipe emerges longitudinally or helically from a coating mechanism by marking the pipe at a predetermined distance from the abutting ends and noting when that mark passes a stationary pointer positioned at a measured distance upstream from the coating machine. The mark on the pipe, being upstream from the abutting ends, can be watched by the operator of the scoring means to time his scoring action to straddle the covered coupling, as shown in Figure 1.

In order to impress the substantially circumferential indentation in the coating 12 on the pipe sections 10 and 11, means, such as two spaced groups of blades 17 and 18 having concave faces 19, are suitably supported so as to be movable at substantially right angles to the axis of pipe sections 10 and 11. Blades 17 and 18 are adapted to be advanced toward the pipe and to penetrate at least partially through coating 12 and then be retracted so as to leave substantially circumferential indentations in the coating. When the coupling sections 13 and 16 are used as in Figure 1, blades 17 and 18 are desirably spaced slightly beyond the outermost ends of the coupling means. This will be found to facilitate the removal of the couplings after the abutting ends of pipe sections 10 and 11 are separated, without damage to the main body of the coating 12. This may take place either while the coating 12 is in its initial plastic condition or after the coating has become hardened. Obviously, the presence or absence of coupling sections 13 and 16 will not affect the operation of blades 17 and 18 and it is possible to use such blades with an internal type of coupling such as has been employed in the prior art, for example that of my Patent No. 2,077,769, which issued April 20, 1937.

In case that blades 17 and 18 are used while pipe sections 10 and 11 are moving longitudinally, it is desirable to provide means for supporting blades 17 and 18, said means being arranged so that the blades will be carried along with the pipe due to their engagement with the coating 12.

Figure 2:
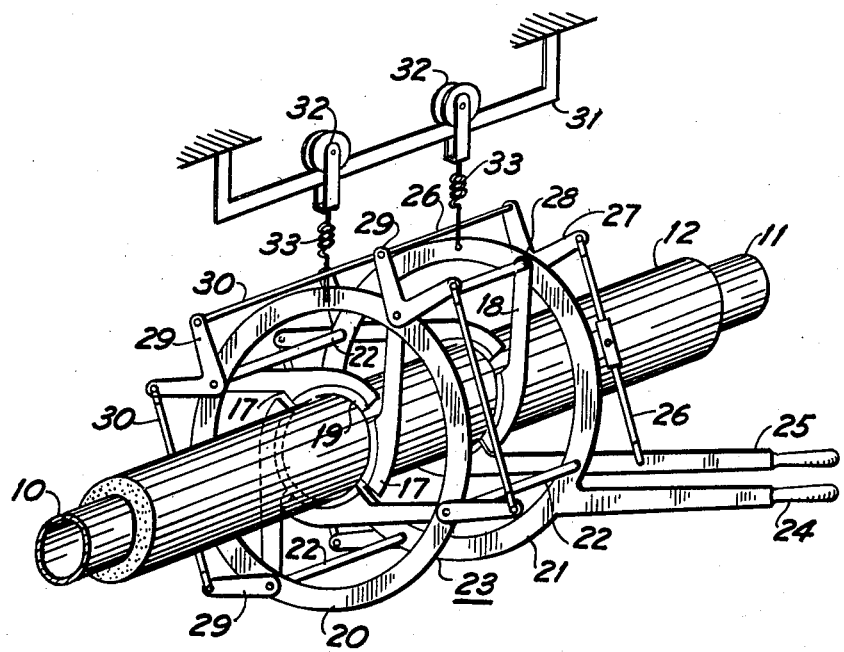
Figure 2 is a perspective view of one means for supporting and actuating the spaced indenting means of Figure 1.

Referring to Figure 2, reference numerals 10 and 11 designate abutting pipe sections which have been covered with coating material 12 and which are axially aligned with the concave faces 19 of the spaced groups of blades 17 and 18. In this drawing, blades 17 and 18 are pivotally mounted on spaced rings 20 and 21 respectively, the latter being joined by a plurality of cross-members 22 to form a frame generally designated 23. Ring 21 is desirably provided with a handle 24 to act as a reaction point for a movable operating handle 25. Handle 25 is linked by rods 26 and bell cranks 27 to blades 18 so that the latter may be simultaneously swung inwardly and outwardly about their pivot points 28 to engage coating 12 and form an indentation in the latter extending substantially entirely around its circumference. Cross-members 22 serve to transmit the motion of bell cranks 27 to similar bell cranks 29 on ring 20, rods 30 acting to connect bell cranks 29 which are secured to pivoted blades 17 so that the latter may be swung inwardly and outwardly simultaneously with blades 18 to form the spaced indentations desired in coating 12.

As stated above, pipe sections 10 and 11 are usually longitudinally advanced through and out of a coating mechanism which may be that illustrated in my copending patent application, Serial No. 222,207, filed July 30, 1938, and issued June 30, 1942, as Patent No. 2,287,825. In order to avoid scraping coating 12 in a direction longitudinally of the pipe sections while blades 17 and 18 engage the coating to form an indentation therein, it is desirable to support frame 22 so that it may move in a plane parallel to the axis of pipe sections 10 and 11. In this example such support is furnished by an overhead rail 31 adapted to receive pulleys 32 connected to frame 23 by resilient means such as springs 33. Assuming pipe sections 10 and 11 to be moving from left to right, frame 23 will first be moved to the left end of rail 31, which bears a predetermined relationship to the stationary pointer mentioned above, before blades 17 and 18 are engaged so that the entire frame can travel with the pipe sections during the short interval of time the blades actually engage coating 12. If the pipe sections are helically advanced, the rotation component of their motion will cause blades 17 and 18 to rotate with respect to the coating 12, which will not interfere with their action but may facilitate it. In this example, rotation of blades 17 and 18 and frame 23 may be prevented by the operator's grasp on handles 24 and 25.

Figure 3 illustrates in more detail the arrangement of blades 18, connected by bell cranks 27, both of which are pivoted at 28 in frame 21 (Figure 2).

An alternative form of means for carrying out this invention is shown in Figure 4, in which the spaced scoring means constitute opposed U-shaped sheet-metal members 34 and 35 which are provided with semi-circular sharpened notches 36 at their outer ends, notches 36 conforming substantially to the periphery of the pipe sections which are to be trimmed. Members 34 and 35 may be mounted on fluid-actuated jacks 37 supported on a car 38 having wheels 39 adapted to move longitudinally on track 40 in a plane parallel to the axis of pipe 10. A flexible hose 41 controlled by valve 42 is adapted to conduct a suitable pressure fluid, such as compressed air, to operate jacks 35 and 37 to close members 34 and 35 about pipe sections 10 and 11. Spring means in jacks 37 may be provided to retract members 34 and 35 away from pipe 10 and coating 12 when the fluid pressure is released. Where coating 12 is made with a bituminous or other thermoplastic binder, it is ordinarily advisable to provide some means of heating the blades or members which are used to form the spaced indentations to prevent adherence of the coating material thereto. In this example, a flexible hose 43 provided with valve 44 may be used to supply gas or other fuel to spaced burners 45 on car 38, the flames from burners 45 serving to heat the outer ends of U-shaped members 34 and 35. As explained above for the operation of the arrangement of Figure 2, the engagement of members 34 and 35 with the coating 12 of an axially moving pipe 10 will cause car 38 to move along with the pipe until the notches 36 have formed the spaced indentations desired in coating 12.

Where small diameter pipes are coated, a much more simple arrangement may be made as illustrated in Figures 5 and 6. Figure 5 shows an overhead rail 31 on which are placed pulleys 32 and springs 33, the latter supporting a hinged frame 46, the axis of the hinge being substantially parallel to rail 31 and the axis of pipe sections 10 and 11. At the outer ends of the two parts of frame 46 are concave members 47 whose faces are curved to conform to the pipe periphery and which are provided with handles 48. Desirably, but not necessarily, the two parts of frame 46 may be normally urged to an open position by spring 49. In operation, handles 48 are grasped and the two parts of frame 46 are pressed together manually, thus impressing the spaced indentations in coating 12 on abutting pipe sections 10 and 11.

Figure 6 illustrates an arrangement for small diameter pipe, similar to that of Figure 5, in which the frame 46 is not specifically supported mechanically by means such as rail 31 and pulleys 32, but is simply picked up by the operator and closed about the coating 12 on pipe sections 10 and 11 to form the indentations at each side of the abutting ends. Desirably, means, such as electrical heating elements 50, may be provided to heat the concave members 47 where such is necessary, with suitable flexible conductors 51 leading to an electrical power source to supply current for elements 50.

It will be apparent from the foregoing description that an improved method and means for trimming or finishing the coating on abutting ends of continuously coated pipe sections have been illustrated and described to an extent which will enable those skilled in the art to practice the invention. The latter is believed to reside in the steps of scoring or indenting an initially plastic coating at a predetermined distance from the end faces of abutting pipe sections to form indentations extending substantially around the circumference, and subsequently removing that part of the coating between the indentations without disturbing the remainder of the coating on the pipe. A preferred apparatus for performing this operation generally consists of opposable concave members constituting spaced scoring means and means for pressing said members into said coating, one on each side of said abutting pipe ends. Obviously, numerous changes and modifications could be made from the specific steps and examples illustrated and described without departing from the invention and all those changes that come within the scope of the appended claims are embraced thereby.

I claim:

1. A device for circumferentially scoring a thick initially plastic coating on each side of the abutting ends of successive pipe sections, comprising a first group of coplanar blades having concave cutting faces conforming substantially to the pipe periphery, a second group of blades similar to said first group and spaced therefrom along the pipe axis, and means for radially advancing and retracting said blades toward and from said coated pipe to produce spaced and substantially completely circumferential scores in said coating to facilitate separation and removal of the coating for a short distance from the ends of said sections without damage to the coating intermediate the ends of said sections.

2. A device according to claim 1 in which said blades are hinged on an axis parallel to said pipe axis.

3. A device according to claim 1 including a support for said blades movable in a plane parallel to the axis of said pipe.

4. A device according to claim 1 including a movable frame for supporting said blades and means for suspending said frame to maintain it in a predetermined position relative to the axis of said coated pipe sections.

5. A device for circumferentially scoring a thick initially plastic coating on each side of the abutting ends of successive longitudinally advancing pipe sections, comprising a frame movably supported on a track parallel to the direction of motion of said coated pipe sections, and means supported by said frame adapted to be constricted around said coated pipe sections to produce longitudinally spaced and substantially completely circumferential indentations in said coating, to facilitate separation and removal of the coating for a short distance from the abutting ends of said sections.

6. A device according to claim 5 in which said coating indenting means comprises opposed pairs of blades having concave faces conforming substantially to the pipe periphery.

7. A device for circumferentially scoring a thick initially plastic coating on each side of the abutting ends of successive longitudinally advancing pipe sections, comprising a frame movably supported on a track parallel to the direction of motion of said coated pipe sections, and means supported by said frame adapted to be pressed into the coating on said sections at right angles to the pipe axis to produce longitudinally spaced and substantially completely circumferential indentations in said coating to facilitate separation and removal of the coating for a short distance from the abutting ends of such sections.

8. A device for circumferentially scoring a thick initially plastic coating on each side of the abutting ends of successive longitudinally advanced pipe sections comprising a hinged frame adapted to be placed adjacent said abutting pipe ends and spaced scoring means secured to said frame, said last-named means being movable in a plane at right angles to the pipe axis to be pressed into said coated pipe sections to produce longitudinally spaced and substantially completely circumferential indentations in said coating to facilitate separation and removal of said coating for a short distance from the abutting ends of said sections.

9. A device according to claim 8 with the addition of guide means for said frame, said guide means being parallel to the axis of said pipe sections, said frame means being movable along said guide means by the engagement of said scoring means with the coating on said longitudinally advancing pipe.

10. A device for circumferentially scoring a thick initially plastic coating on each side of the abutting ends of successive longitudinally advanced pipe sections comprising opposable concave members constituting at least two spaced scoring means, and means for pressing said members into said coating, one on each side of said abutting pipe ends, to form a substantially circumferential indentation therein.

WILLIAM R. POSTLEWAITE.